United States Patent
Shimada et al.

(10) Patent No.: US 9,951,242 B1
(45) Date of Patent: Apr. 24, 2018

(54) ELECTRIC WIRE COATING MATERIAL COMPOSITION, INSULATED ELECTRIC WIRE, AND WIRE HARNESS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Tatsuya Shimada, Mie (JP); Masashi Satou, Mie (JP); Satoshi Murao, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/558,662

(22) PCT Filed: Mar. 3, 2016

(86) PCT No.: PCT/JP2016/056519
§ 371 (c)(1),
(2) Date: Sep. 15, 2017

(87) PCT Pub. No.: WO2016/152432
PCT Pub. Date: Sep. 29, 2016

(30) Foreign Application Priority Data

Mar. 24, 2015 (JP) ................................. 2015-061294

(51) Int. Cl.
| | |
|---|---|
| *H01B 3/00* | (2006.01) |
| *C09D 123/26* | (2006.01) |
| *H01B 3/44* | (2006.01) |
| *H01B 7/00* | (2006.01) |
| *C09D 5/18* | (2006.01) |

(52) U.S. Cl.
CPC ............. *C09D 123/26* (2013.01); *C09D 5/18* (2013.01); *H01B 3/441* (2013.01); *H01B 7/0045* (2013.01)

(58) Field of Classification Search
CPC ....................................................... H01B 3/00
See application file for complete search history.

(56) References Cited

U.S. PATENT DOCUMENTS

| | | | |
|---|---|---|---|
| 2012/0273268 A1* | 11/2012 | Shimada ................. | C08L 23/02 174/72 A |
| 2013/0161064 A1* | 6/2013 | Shimada ................. | C08L 23/02 174/113 R |
| 2013/0273367 A1 | 10/2013 | Shimada | |

FOREIGN PATENT DOCUMENTS

| | | |
|---|---|---|
| JP | 2000212291 A | 8/2000 |
| JP | 2000294039 A | 10/2000 |
| JP | 2005044596 A | 2/2005 |
| JP | WO2008078406 A | 7/2008 |
| JP | 2012158629 A | 8/2012 |
| JP | 2014111721 A | 6/2014 |

OTHER PUBLICATIONS

International Search Report for application PCT/JP2016/056519 dated Apr. 26, 2016; 9 pages.

* cited by examiner

*Primary Examiner* — Chau N Nguyen
(74) *Attorney, Agent, or Firm* — Reising Ethington, P.C.

(57) ABSTRACT

A flame-retardant electric wire coating material composition that can improve heat resistance without using electron beam cross-linking, has no risk of reducing the mechanical characteristics and chemical resistance due to no metal hydroxides being added thereto as flame retardants, and can suppress the formation of die lip build-up and the like during manufacturing to achieve favorable productivity, and an insulated electric wire and a wire harness. The electric wire coating material composition may include:
  a silane-grafted polyolefin (A);
  an unmodified polyolefin (B);
  a modified polyolefin (C);
  a bromine-based flame retardant and antimony trioxide (D);
  a cross-linking catalyst batch (E);
  zinc oxide and an imidazole-based compound modified with a mercapto group, or zinc sulfide (F);
  an antioxidant, a metal deactivator, and a lubricant (G);
  silicone oil (H); and
  no metal hydroxides.

8 Claims, No Drawings

ELECTRIC WIRE COATING MATERIAL COMPOSITION, INSULATED ELECTRIC WIRE, AND WIRE HARNESS

CROSS REFERENCE TO RELATED APPLICATIONS

This application claims the priority of Japanese patent application JP2015-061294 filed on Mar. 24, 2015, the entire contents of which are incorporated herein.

TECHNICAL FIELD

The present invention relates to an electric wire coating material composition, an insulated wire, and a wire harness, and more specifically to an electric wire coating material composition that is preferable for a coating material for an insulated electric wire, such as a wire harness for an automobile, to be used at a position where high heat resistance is required, and an insulated electric wire and a wire harness.

BACKGROUND ART

In recent years, as a result of widespread use of hybrid cars and the like, electric wires and connectors, which are automobile parts, are required to have high voltage resistance and high heat resistance. Conventionally, electric wires coated with a cross-linked vinyl chloride resin or electric wires coated with a cross-linked polyolefin have been used as insulated electric wires, such as wire harnesses for automobiles, to be used at positions with high temperatures. An electron beam cross-linking method is mainly used to perform cross-linking in these insulated electric wires (see Patent Document 1 JP2000-294039A, for example).

However, there is a problem in that an expensive electron beam cross-linking apparatus or the like is required to perform electron beam cross-linking, and equipment cost increases, resulting in increased product cost. Therefore, silane cross-linking that can be performed with inexpensive equipment has been attracting attention. Polyolefin compositions in which silane cross-linking can be performed and that are to be used in coating materials for electric wires, cables, and the like are known (see Patent Document 2 JP2000-212291A, for example).

SUMMARY

However, it is necessary to add a filler serving as a flame retardant in order to impart flame retardance, which is a main essential characteristic of electric wires for automobiles. When inorganic flame retardants such as metal hydroxides are used, there is a risk that the flame retardants will be blended in a large amount, thus causing a decrease in mechanical characteristics. To address this, halogen-based organic flame retardants that have a higher flame retarding effect than the inorganic flame retardants have can be used to reduce the blend amount.

However, when the halogen-based organic flame retardants are used, a problem arises in that a gelation rate, which is an index of the degree of cross-linking, and wear resistance are likely to decrease.

In materials for silane cross-linking, which is also known as water cross-linking, there is a concern that cross-linking is promoted by moisture in air during heat molding, resulting in the generation of abnormal substances, and therefore it is necessary to suppress the heating step as much as possible. Accordingly, a non-silane resin is generally used to form a masterbatch of the flame retardant. However, the formation of this masterbatch causes a problem in that the degree of cross-linking of the coating material decreases because the non-silane resin serving as a non-cross-linking component is contained therein, thus making it difficult to satisfy the standards on heat resistance and the like of automobiles.

Furthermore, the formation of this masterbatch also causes a problem in that a material containing a large amount of powder substances such as halogen-based organic flame retardants needs to be processed, and die lip build-up and the like are likely to be formed during the formation of an electric wire coating material through extrusion molding of an electric wire coating material composition, resulting in a decrease in the productivity of coated electric wires.

On the other hand, it is conceivable that a measure for improving the cross-linking density of the silane resin is taken in order to improve the degree of cross-linking of the electric wire coating material. However, an increase in the cross-linking density of the silane resin causes a problem in that excessively cross-linked abnormal substances are likely to be generated during molding, and also cause die lip build-up, resulting in a decrease in the productivity.

In recent years, as a voltage and a current to be used has been increased, the diameters of electric wires have been increased. Therefore, the electric wires increase in weight and become hard, thus causing a problem in that the workability for assembly of a wire harness and the like decreases. When the flexibility of the electric wires is improved to address this, a problem arises in that an affinity to an organic solvent such as gasoline or light oil to be used in automobiles increases, and thus the electric wires are likely to swell.

The present design was achieved in order to provide a flame-retardant electric wire coating material composition that can improve heat resistance without using electron beam cross-linking, has no risk of reducing the mechanical characteristics and chemical resistance due to no metal hydroxides being added thereto as flame retardants, and can suppress the formation of die lip build-up and the like during manufacturing to achieve favorable productivity, and an insulated electric wire and a wire harness.

In order to solve the foregoing problems, an electric wire coating material composition according to the present design includes:

a silane-grafted polyolefin (A) obtained by grafting a silane coupling agent to a polyolefin having a density of 0.855 to 0.920 g/cm$^3$;

an unmodified polyolefin (B) having a density of 0.885 to 0.956 g/cm$^3$;

a modified polyolefin (C) modified with one or more functional groups selected from a carboxylic acid group, an acid anhydride group, an amino group, an acrylic group, a methacrylic group, and an epoxy group;

a bromine-based flame retardant and antimony trioxide (D);

a cross-linking catalyst batch (E) obtained by dispersing a cross-linking catalyst in a binder resin;

zinc oxide and an imidazole-based compound modified with a mercapto group, or zinc sulfide (F);

an antioxidant, a metal deactivator, and a lubricant (G);

silicone oil (H); and no metal hydroxides.

In the electric wire coating material composition of the present design, it is preferable that the silicone oil (H) is dimethylsilicone oil or a mixture of dimethylsilicone oil and a polyolefin.

In the electric wire coating material composition of the present design, it is preferable that the polyolefin in the silane-grafted polyolefin (A) prior to silane-grafting has a density of 0.855 to 0.900 g/cm$^3$, and the unmodified polyolefin (B) has a density of 0.885 to 0.955 g/cm$^3$.

In the electric wire coating material composition of the present design, it is preferable that the polyolefin used in the silane-grafted polyolefin (A) prior to silane-grafting has a degree of crystallization of 10 to 25%, a melt flow rate of 0.5 to 5 g/10 minutes at 190° C. under a load of 2.16 kg, a Shore A hardness of 55 to 80, and a flexural modulus of 3 to 350 MPa, and the silane-grafted polyolefin has a gel fraction of 70 to 95%, the unmodified polyolefin (B) has a melt flow rate of 0.5 to 5 g/10 minutes at 190° C. under a load of 2.16 kg, and a flexural modulus of 10 to 1000 MPa, the bromine-based flame retardant (D) has a melting point of 200° C. or higher, or alternatively is ethylenebistetrabromophthalimide or ethylenebispentabromophenyl, and the antioxidant (G) is hindered phenol having a melting point of 200° C. or higher, the metal deactivator is a salicylic acid derivative, and the lubricant is a derivative of erucic acid, oleic acid, or stearic acid, or polyethylene-based wax.

It is preferable that the electric wire coating material composition of the present design contains:

the silane-grafted polyolefin (A) in an amount of 30 to 90 parts by mass; and a total of the unmodified polyolefin (B) and the modified polyolefin (C) in an amount of 10 to 70 parts by mass, the electric wire coating material further containing, with respect to 100 parts by mass of a total of the (A), (B), and (C):

the bromine-based flame retardant and the antimony trioxide (D) in an amount of 10 to 70 parts by mass;

the cross-linking catalyst batch (E) in an amount of 2 to 20 parts by mass, the cross-linking catalyst batch comprising a silanol condensation catalyst in an amount of 0.5 to 5 parts by mass with respect to 100 parts by mass of a polyolefin;

the zinc oxide and the imidazole-based compound (F) each in an amount of 1 to 15 parts by mass, or the zinc sulfide in an amount of 1 to 15 parts by mass;

the antioxidant, the metal deactivator, and the lubricant (G) in an amount of 1 to 10 parts by mass in total; and the silicone oil (H) in an amount of 0.5 to 5 parts by mass, or a mixture of silicone oil and a polyolefin at a mass ratio of 1:1 in an amount of 1 to 10 parts by mass.

In the electric wire coating material composition of the present design, it is preferable that the polyolefin used in the silane-grafted polyolefin (A) and the polyolefin used in the unmodified polyolefin (B) are one or more selected from very low-density polyethylene, linear low-density polyethylene, and low-density polyethylene.

An insulated electric wire of the present design includes an electric wire coating material made of a cross-linked polyolefin resin obtained by performing water cross-linking on the above-mentioned electric wire coating material composition.

It is preferable that, in the insulated electric wire of the present design, the above-mentioned electric wire coating material composition includes:

a component a including the silane-grafted polyolefin (A);

a component b including the unmodified polyolefin (B); the modified polyolefin (C); the bromine-based flame retardant and the antimony trioxide (D); the zinc oxide and the imidazole-based compound, or zinc sulfide (F); the antioxidant, the metal deactivator, and the lubricant (G); and silicone oil (H) or a mixture of silicone oil and a polyolefin; and a component c including the cross-linking catalyst batch (E), and the components a, b, and c are kneaded and used to form an electric wire coating material around an electric wire conductor, and water cross-linking is performed on the electric wire coating material.

A wire harness of the present design includes the above-mentioned insulated electric wire The present design uses an electric wire coating material composition containing the above components (A) to (H) and no metal hydroxides, and thus can provide a flame-retardant electric wire coating material composition that can improve heat resistance without using electron beam cross-linking, has no risk of reducing the mechanical characteristics and chemical resistance due to no metal hydroxides being added thereto as flame retardants, and can suppress the formation of die lip build-up and the like during manufacturing to achieve favorable productivity, and an insulated electric wire and a wire harness.

DESCRIPTION OF EMBODIMENTS

Hereinafter, embodiments will be described in detail. The above components (A) to (H) will be described.

(A) Silane-Grafted Polyolefin

A silane coupling agent is grafted to a polyolefin having a density of 0.855 to 0.920 g/cm$^3$. Examples of the polyolefin (also referred to as "base resin") to be subjected to silane-grafting include the polyolefins below. The polyolefins below can be used as the unmodified polyolefins (B), polyolefins to be modified to produce the modified polyolefins (C), and the like, which will be described later.

Examples of the above polyoflefins include polyethylene, polypropylene, other olefin homopolymers, ethylene-based copolymers such as ethylene-α olefin copolymers, ethylene-vinyl acetate copolymers, ethylene-acrylate copolymers, and ethylene-methacrylate copolymers, and propylene-based copolymers such as propylene-α olefin copolymers, propylene-vinyl acetate copolymers, propylene-acrylate copolymers, and propylene-methacrylate copolymers. These polyolefins may be used alone or in combination. Polyethylene, polypropylene, the ethylene-vinyl acetate copolymers, the ethylene-acrylate copolymers, and the ethylene-methacrylate copolymers are preferably used.

Examples of the above polyethylene include high-density polyethylene (HDPE), medium-density polyethylene (MDPE), low-density polyethylene (LDPE), linear low-density polyethylene (LLDPE), very low-density polyethylene (VLDPE), and metallocene very low-density polyethylene. These polyethylenes may be used alone or in combination. The polyolefin is preferably the low-density polyethylene such as the metallocene very low-density polyethylene. When the low-density polyethylene is used, the flexibility of electric wires is improved, and excellent extrudability is achieved, which improves the productivity.

A polyolefin elastomer based on an olefin may be used as the above polyolefin. The polyolefin elastomer can impart flexibility to a coating. Examples of the polyolefin elastomer include olefin-based thermoplastic elastomers (TPO) such as ethylene-based elastomers (PE elastomers) and propylene-based elastomers (PP elastomers), an ethylene-propylene copolymer (EPM, EPR), and ethylene-propylene-diene copolymers (EPDM, EPT).

The polyolefin to be used in the silane-grafted polyolefin has a density within a range of 0.855 to 0.920 g/cm$^3$, preferably a range of 0.855 to 0.900 g/cm$^3$, and more preferably a range of 0.865 to 0.885 g/cm$^3$.

The lower the density of the polyolefin is, the more easily the silane coupling agent is grafted thereto. However, when the density is less than 0.855 g/cm$^3$, the heat resistance, chemical resistance, and wear resistance of the electric wires are likely to decrease, and thus blocking of pellets is likely to occur. On the other hand, when the density of the polyolefin exceeds 0.960 g/cm$^3$, crystalline components increase, thus causing a risk of a decrease in the grafting rate (gel fraction) and a decrease in the flexibility. The density of the polyolefin is a value measured in conformity with D792 of the ASTM standards.

It is preferable that the polyolefin to be used in the silane-grafted polyolefin (A) has a degree of crystallization of 10 to 25%. There is a correlation between the degree of crystallization and density of the polyolefin. When the degree of crystallization decreases, the density decreases, and when the degree of crystallization increases, the density increases.

The degree of crystallization of the polyolefin is a value obtained by measuring the melting heat amount of a resin pellet using a differential scanning calorimeter and making a calculation based on a literature value of a theoretical heat amount for a perfect crystal of the resin. In the case of polyethylene-based resin, a literature value for high-density polyethylene (HDPE), 293 J/g, is used, and in the case of polypropylene-based resin, a literature value for homopolypropylene, 209 J/g, is used. "DSC6200" (product name) manufactured by Hitachi High-Tech Science Corporation was used as the above differential scanning calorimeter.

It is preferable that the polyolefin to be used in the silane-grafted polyolefin has a melt flow rate (also referred to as "MFR" hereinafter) of 0.5 to 5 g/10 minutes at 190° C. under a load of 2.16 kg. Specifying the MFR of the polyolefin contributes to the moldability of the electric wires and the mixed coating material. When the silane-grafted polyolefin has a MFR of less than 0.5 g/10 minutes, there is a risk that the extrusion moldability will become poor, and thus the production amount per unit time will decrease. On the other hand, when the MFR exceeds 5 g/10 minutes, there is a risk that the resin will be likely to drip during the molding of the electric wires, resulting in a decrease in the productivity, and there is a concern that the wear resistance and heat resistance will decrease due to a decrease in molecular weight. In the present invention, the MFR is a value measured in conformity with D1238 of the ASTM standards.

It is preferable that the polyolefin to be used in the silane-grafted polyolefin has a Shore A hardness of 55 to 80. The Shore A hardness is a value measured in conformity with D2240 of the ASTM standards. Specifying the Shore A hardness contributes to an improvement in the flexibility and wear resistance of the electric wires.

It is preferable that the polyolefin to be used in the silane-grafted polyolefin has a flexural modulus of 3 to 350 MPa. The flexural modulus is a value measured at room temperature in conformity with D790 of the ASTM standards. Specifying the flexural modulus of the polyolefin contributes to an improvement in the flexibility and wear resistance of the electric wires.

It is preferable that the silane-grafted polyolefin has a gel fraction within a range of 70 to 95%. When the gel fraction is within the above range, the heat resistance, chemical resistance, and the like are further improved.

The gel fraction of the silane-grafted polyolefin is a value obtained through measurement using the measurement method below and determination using the equation below. A blend material obtained by adding 5 parts by mass of a cross-linking catalyst masterbatch (which will be described in the section of Examples in detail) to 100 parts by mass of the silane-grafted polyolefin is kneaded using "LABO PLASTOMILL" manufactured by Toyo Seiki Seisaku-sho, Ltd. at 200° C. for 5 minutes, and the obtained mass is subjected to compression pressing at 200° C. for 3 minutes and molded into a sheet having a thickness of 1 mm. The obtained molded sheet is subjected to vapor cross-linking for 12 hours in a constant-temperature and constant-humidy oven in which the humidity is set to 95% and the temperature is set to 60° C., and then dried at room temperature for 24 hours. Thereafter, 0.1 g of a test piece is collected and weighed, and thus the mass prior to immersion in xylene is determined. Then, the test piece is immersed in a xylene solvent at 120° C. and removed therefrom after 20 hours. The removed test piece is dried at 100° C. for 6 hours, and the dried test piece is weighed to determine the mass after immersion in xylene. The gel fraction is determined as a mass percentage of the mass of the test piece after the immersion in the xylene solvent with respect to the mass thereof prior to the immersion therein in accordance with the following equation.

$$\text{Gel fraction \%} = (\text{mass after immersion in xylene}/\text{mass prior to immersion in xylene}) \times 100$$

Examples of the silane coupling agent to be used in the silane-grafted polyolefin include a vinylalkoxysilane such as vinyltrimethoxysilane, vinyltriethoxysilane, and vinyltributoxysilane, normalhexyltrimethoxysilane, vinylacetoxysilane, γ-methacryloxypropyltrimethoxysilane, and γ-methacryloxypropylmethyldimethoxysilane. These agents may be used alone or in combination of two or more.

The blend amount of the silane coupling agent in the silane-grafted polyolefin is preferably within a range of 0.5 to 5 parts by mass, and more preferably within a range of 3 to 5 parts by mass, with respect to 100 parts by mass of the polyolefin to which the silane coupling agent is to be grafted. When the blend amount of the silane coupling agent is less than 0.5 parts by mass, a small amount of the silane coupling agent is grafted, and thus it is difficult to achieve a sufficient degree of cross-linking during silane cross-linking. On the other hand, when the blend amount of the silane coupling agent exceeds 5 parts by mass, the cross-linking reaction excessively progresses during kneading, and thus gel-like materials are likely to be generated. As a result, unevenness is likely to be formed in the product surface, and thus mass productivity is likely to deteriorate. Moreover, melting viscosity increases excessively, resulting in the application of overload to an extruder, and thus workability is likely to deteriorate.

It is preferable that the upper limit of the graft amount of the silane coupling agent (a ratio of the mass of the silane coupling agent grafted to the polyolefin with respect to the mass of the polyolefin to be subjected to silane-grafting) is preferably 15 mass % or less, more preferably 10 mass % or less, and even more preferably 5 mass % or less, in terms of avoiding the generation of abnormal substances caused by excessive cross-linking during an electric wire coating step. On the other hand, it is preferable that the lower limit of the above graft amount is preferably 0.1 mass % or more, more preferably 1 mass % or more, and even more preferably 2.5 mass % or more, in terms of securing the degree of cross-linking (gel fraction) or the like of the electric wire coating.

For example, a method for manufacturing a silane-grafted polyolefin by grafting a silane coupling agent to a polyolefin generally includes adding a free-radical generator to a polyolefin and a silane coupling agent and mixing them using a twin-screw extruder, a short-screw extruder, or the like. In addition, a method of adding a silane coupling agent during the polymerization of a polyolefin may also be used.

The silane-grafted polyolefin in which the silane coupling agent has been grafted is kept as a silane graft batch (component a), and stored separately from other components, namely a flame retardant batch (component b) and a catalyst batch (component c), which will be described later, until the composition is kneaded.

Examples of the above free-radical generator include organic peroxides such as dicumyl peroxide (DCP), benzoyl peroxide, dichlorobenzoyl peroxide, di-tert-butyl peroxide, butyl peracetate, tert-butyl perbenzoate, and 2,5-dimethyl-2,5-di(tert-butylperoxy)hexane. The free-radical generator is not limited to the above organic peroxides, and other peroxides and other radical generators may also be used.

The free-radical generator is more preferably dicumyl peroxide (DCP). When DCP is used as the free-radical generator, it is preferable that a temperature at which the silane graft batch is prepared through graft-polymerization of the polyolefin and the silane coupling agent is set to 120° C. or higher, and preferably 160° C. or higher. The reason for this is that a favorable graft efficiency is achieved, and thus the reaction time is shortened.

It is preferable that the blend amount of the free-radical generator is within a range of 0.025 to 0.1 parts by mass with respect to 100 parts by mass of the polyolefin to be modified with silane. When the blend amount of the free-radical generator is less than 0.025 parts by mass, the graft reaction due to the silane coupling agent has difficulty progressing sufficiently, and thus it is difficult to obtain a desired gel fraction. On the other hand, when the blend amount of the free-radical generator exceeds 0.1 parts by mass, the ratio of cleaved polyolefin molecules increases, and undesired peroxide cross-linking is likely to progress. As a result, during kneading with the flame retardant batch and the catalyst batch, unevenness is likely to be formed in the product surface, and processability decreases due to a decrease in molecular weight. This makes it likely that processability and the external appearance will deteriorate.

The above free-radical generator may be diluted with an inert substance such as talc or calcium carbonate, or diluted with ethylene-propylene rubber, ethylene-propylene-diene rubber, polyolefin, a polyolefin-α-olefin copolymer, or the like to form a pellet.

(B) Unmodified Polyolefin

A polyolefin that is not modified with the silane coupling agent, functional groups, or the like is used as an unmodified polyolefin. The unmodified polyolefin has a density within a range of 0.885 to 0.956 g/cm$^3$, and preferably a range of 0.885 to 0.955 g/cm$^3$. When the unmodified polyolefin has a density of less than 0.885 g/cm$^3$, the heat resistance, chemical resistance, wear resistance, and flex resistance of the electric wires are likely to decrease. When the unmodified polyolefin has a density of more than 0.956 g/cm$^3$, there is a risk that the flexibility will decrease.

It is preferable that the unmodified polyolefin has a MFR of 0.5 to 5 g/10 minutes at 190° C. under a load of 2.16 kg. In the same manner as in the specification of the MFR of the silane-grafted polyolefin, when the unmodified polyolefin has a MFR of less than 0.5 g/10 minutes, there is a risk that the extrusion moldability will become poor, and thus the production amount per unit time will decrease. On the other hand, when the MFR exceeds 5 g/10 minutes, there is a risk that the resin will be likely to drip during the molding of the electric wires, resulting in a decrease in the productivity, and there is a concern that the wear resistance and heat resistance will decrease due to a decrease in molecular weight.

The materials shown as the examples of the polyolefin to be used in the silane-modified polyolefin can be used as a polyolefin to be used in the above unmodified polyolefin.

(C) Modified Polyolefin

It is preferable to use, as a polyolefin to be used in a modified polyolefin, a resin that is in the same series as the resin to be used as the unmodified polyolefin, in terms of compatibility. In addition, polyethylene such as VLDPE or LDPE is preferable because it contributes to the flexibility of the electric wires, and a filler serving as a flame retardant is favorably dispersed in it.

Examples of the functional group to be used in the modified polyolefin include a carboxylic acid group, an acid anhydride group, an amino group, an acrylic group, a methacrylic group, an epoxy group, an oxazoline group, a hydroxyl group, and a silane group. It is preferable that the functional group is one or more selected from a carboxylic acid group, an acid anhydride group, an amino group, an acrylic group, a methacrylic group, an epoxy group, and an oxazoline group. A maleic acid group, an epoxy group, an amino group, and the like are more preferable. The adhesiveness to an additive such as a bromine-based flame retardant or antimony trioxide is improved through the functional group modification, and thus the strength of the resin is less likely to decrease.

It is preferable that the functional group modification ratio in the modified polyolefin is within a range of 0.05 to 15 parts by mass with respect to 100 parts by mass of the polyolefin. When the functional group modification ratio exceeds 15 parts by mass, there is a risk that a coating stripping property will decrease during terminal processing. When the functional group modification ratio is less than 0.05 parts by mass, there is a risk that a functional group modification effect will be obtained insufficiently.

Examples of a method for modifying a polyolefin with a functional group include a method for performing graft-polymerization of a compound having a functional group and a polyolefin, and a method for copolymerizing a compound having a functional group and an olefin monomer to form an olefin copolymer.

Specific examples of a compound to be used to introduce a carboxyl group or an acid anhydride group as the functional group include α,β-unsaturated dicarboxylic acids such as maleic acid, fumaric acid, citraconic acid, and itaconic acid; anhydrides of the α,β-unsaturated dicarboxylic acids; and unsaturated monocarboxylic acids such as acrylic acid, methacrylic acid, furoic acid, crotonic acid, vinylacetic acid, and pentenoic acid.

Specific examples of a compound to be used to introduce an amino group as the functional group include aminoethyl (meth)acrylate, propylaminoethyl (meth)acrylate, dimethylaminoethyl (meth)acrylate, diethylaminoethyl (meth)acrylate, dibutylaminoethyl (meth)acrylate, aminopropyl (meth)acrylate, phenylaminoethyl (meth)acrylate, and cyclohexylaminoethyl (meth)acrylate.

Specific examples of a compound to be used to introduce an epoxy group as the functional group include glycidyl acrylate; glycidyl methacrylate; monoglycidyl itaconate; monoglycidyl butenetricarboxylate; diglycidylbutenetricarboxylate; triglycidyl butenetricarboxylate; glycidyl esters of α-chloroacrylic acid, maleic acid, crotonic acid, fumaric acid, and the like; glycidyl ethers such as vinylglycidyl ether, allylglycidyl ether, glycidyloxyethylvinyl ether, and styrene-p-glycidyl ether; and p-glycidyl styrene.

When the total of the above resin components (A), (B), and (C) is taken as 100 parts by mass, the blend ratio of the silane-grafted polyolefin (A) is 30 to 90 parts by mass, and the total of the unmodified polyolefin (B) and the modified polyolefin (C) is 10 to 70 parts by mass. It is preferable to mix the unmodified polyolefin (B) and the modified polyolefin (C) such that the ratio of (B) to (C) is within a range of 95:5 to 50:50 because excellent compatibility is achieved, and the productivity and the dispersibility of the flame retardant are improved.

(D) Bromine-based Flame Retardant and Antimony Trioxide

The present design includes no metal hydroxide-based flame retardants such as magnesium hydroxide (synthetic magnesium hydroxide, natural magnesium hydroxide) and aluminum hydroxide, and uses a bromine-based flame retardant and antimony trioxide. The decrease in elongation after long-term heating can be suppressed and the long-term heat resistance can be improved due to the composition containing no metal hydroxides.

A bromine-based flame retardant having a phthalimide structure such as ethylenebistetrabromophthalimide or ethylenebistribromophthalimide, or ethylenebispentabromophenyl is suitable as the bromine-based flame retardant. The reason for this is that these compounds are less soluble in hot xylene than other compounds and thus have a favorable gel fraction, and in addition, these compounds have a high melting point and thus have an excellent heat resistance. It is preferable that the bromine-based flame retardant has a melting point of 200° C. or higher, or alternatively is either ethylenebistetrabromophthalimide or ethylenebispentabromophenyl.

Regarding the bromine-based flame retardant, the above phthalimide-based bromine-based flame retardants and ethylenebispentabromophenyl may be used alone or used together with bromine-based flame retardants below. Specifically, ethylenebis(pentabromobenzene) (also referred to as "bis(pentabromophenyl)ethane"), tetrabromobisphenol A (TBBA), hexabromocyclododecane (HBCD), TBBA-carbonate oligomer, TBBA-epoxy oligomer, brominated polystyrene, TBBA-bis(dibromopropyl ether), poly(dibromopropyl ether), hexabromobenzene (HBB), and the like can be used. These flame retardants can be used without limitation if they are used only for the purpose of imparting flame retardance to the electric wires. However, in order to impart sufficient gel fraction or heat resistance to the electric wires, it is preferable to use these flame retardants together with the flame retardants having a phthalimide structure.

Antimony trioxide is used as a flame retardant aid for the bromine-based flame retardant. When antimony trioxide is used together with the bromine-based flame retardant, a synergistic effect is obtained. It is preferable to use antimony trioxide having a purity of 99% or more. The antimony trioxide to be used is antimony trioxide that was produced as a mineral and was micronized through pulverization. At this time, the average particle diameter is preferably 3 µm or less, and more preferably 1 µm or less. When the particle diameter is increased, there is a risk that the strength of an interface with the resin will decrease. Surface treatment may be performed for the purpose of controlling the particle diameter and improving the strength of an interface with the resin. Preferred examples of the surface-treating agent include a silane coupling agent, a higher fatty acid, and polyolefin wax.

It is preferable to mix the bromine-based flame retardant and the antimony trioxide such that the equivalent ratio of the bromine-based flame retardant to the antimony trioxide is within a range of 3:1 to 2:1.

It is sufficient that the blend amount of the flame retardant is determined as appropriate depending on the desired flame retarding effect and the type of the flame retardant. The blend amount thereof is preferably within a range of 10 to 70 parts by mass, and more preferably within a range of 15 to 45 parts by mass, with respect to 100 parts by mass of the total amount of the above resin components (A), (B), and (C).

(E) Cross-linking Catalyst Batch

A cross-linking catalyst batch is obtained by dispersing a cross-linking catalyst in a binder resin. A non-cross-linked (non-silane-modified) polyolefin is preferably used as the binder resin.

The above cross-linking catalyst is a silanol condensation catalyst for performing silane cross-linking on the silane-grafted polyolefin. Examples of the cross-linking catalyst include metal carboxylates such as tin carboxylate, zinc carboxylate, iron carboxylate, lead carboxylate, and cobalt carboxylate, organic metal compounds such as titanic acid esters, organic bases, inorganic acids, and organic acids. Specific examples thereof include dibutyltin dilaurate, dibutyltin dimalate, dibutyltin mercaptide (e.g., a dibutyltin bisoctylthioglycol ester salt and a dibutyltin β-mercaptopropionic acid salt polymer), dibutyltin diacetate, dioctyltin dilaurate, stannous acetate, stannous caprylate, lead naphthenate, cobalt naphthenate, barium stearate, calcium stearate, tetrabutyl titanate, tetranonyl titanate, dibutylamine, hexylamine, pyridine, sulfric acid, hydrochloric acid, toluenesulfonic acid, acetic acid, stearic acid, and maleic acid. The cross-linking catalyst is preferably an organic tin compound such as dibutyltin dilaurate, dibutyltin dimalate, or dibutyltin mercaptide.

Examples of the polyolefin to be used as the above binder resin include the polyolefins shown in the above description of (A), (B), and (C). In particular, LDPE, LLDPE, VLDPE, and the like are preferable. The reason for this is the same as the reason for the selection of the polyolefins for the silane-grafted polyolefin, the unmodified polyolefin, and the modified polyolefin. It is preferable to use a resin that is in the same series as the silane-grafted polyolefin, the unmodified polyolefin, and the modified polyolefin in terms of compatibility.

When the polyolefin is used as the binder resin and the sianol condensation catalyst is used as the cross-linking catalyst, the binder resin and the cross-linking catalyst are blended in the cross-linking catalyst batch such that a ratio of the silanol condensation catalyst is preferably within a range of 0.5 to 5 parts by mass, and more preferably within a range of 1 to 5 parts by mass, with respect to 100 parts by mass of the polyolefin. When the ratio of the cross-linking catalyst is less than 0.5 parts by mass, the blend amount of the polyolefin increases, and thus the blend amount of the polyolefin in the electric wire coating composition increases. Since a non-silane-cross-linked polyolefin is used as this polyolefin, there is a risk that the cross-linking density will decrease.

The blend amount of the cross-linking catalyst batch (E) is preferably within a range of 2 to 20 parts by mass, and more preferably within a range of 5 to 15 parts by mass, with respect to 100 parts by mass of the total amount of the above components (A), (B), and (C). When the blend amount thereof is less than 2 parts by mass, cross-linking is less likely to progress, and thus there is a risk that the cross-linking will be partially achieved. When the blend amount thereof exceeds 20 parts by mass, the ratio of the non-crosslinked resin and the non-flame-retardant resin in the components increases, and therefore, there is a risk that the flame retardance and heat resistance will be adversely affected.

When the cross-linking catalyst batch is directly mixed to the silane graft batch (component a) containing the silane-grafted polyolefin, cross-linking progresses. Therefore, in general, the cross-linking catalyst batch is added thereto in the electric wire coating step. A method of forming a flame-retardant batch using the flame retardant together with the cross-linking catalyst, and a method of forming an independent batch by mixing the cross-linking catalyst and a resin can be used as the method for adding the cross-linking catalyst. Either of the methods may be selected. It is preferable to form a cross-linking catalyst batch dedicated to the cross-linking catalyst. This is advantageous in that an unnecessary reaction that may occur due to the cross-linking catalyst and the flame retardant being mixed together is suppressed, and the blend amount of the catalyst is controlled easily.

(F) Zinc Oxide and Imidazole-Based Compound Modified with Mercapto Group, or Zinc Sulfide Zinc oxide, an imidazole-based compound, and zinc sulfide are used as additives for improving heat resistance. Even if either of combined use of zinc oxide and an imidazole-based compound or addition of only zinc sulfide is selected, the same heat resistant effect is obtained.

The above zinc oxide is obtained through a method of oxidizing, with air, zinc vapor generated by adding a reducing agent such as coke to a zinc ore and firing them, or a method of using zinc sulfate or zinc chloride as a material. There is no limitation on the method for manufacturing zinc oxide, and zinc oxide may be manufactured using any method. Also, zinc sulfide manufactured using a known manufacturing method can be used. The zinc oxide and zinc sulfide preferably have an average particle diameter of 3 μm or less, and more preferably 1 μm or less. When the average particle diameter of the zinc oxide and zinc sulfide is reduced, an improvement in the strength of an interface with the resin, and an improvement in the dispersibility can be expected.

Examples of the imidazole-based compound modified with a mercapto group include 2-mercaptobenzimidazole, 2-mercaptomethylbenzimidazole, 4-mercaptomethylbenzimidazole, 5-mercaptomethylbenzimidazole, and zinc salts thereof. A particularly preferred mercaptobenzimidazole is 2-mercaptobenzimidazole and a zinc salt thereof because they are less likely to sublimate during mixing and thus are stable at high temperatures. Typical examples thereof include commercially available products such as ANTAGE manufactured by Kawaguchi Chemical Industry Co., Ltd. and NOCRAC MB manufactured by Ouchi Shinko Chemical Industrial Co., Ltd.

When the blend amount of the zinc sulfide, or the zinc oxide and the imidazole-based compound is small, there is a risk that a heat resistance improving effect will be obtained insufficiently, and when the blend amount thereof is too large, there is a risk that the particles will be likely to aggregate, resulting in deterioration of the external appearance, and mechanical characteristics such as wear resistance will decrease. Therefore, the following range is preferable. It is preferable that the ratio of the zinc sulfide is 1 to 15 parts by mass, or each of the ratios of the zinc oxide and the imidazole-based compound is 1 to 15 parts by mass, with respect to 100 parts by mass of the total amount of the above resin components (A) to (C).

(G) Antioxidant, Metal Deactivator, and Lubricant

A hindered phenol-based antioxidant is used as an antioxidant. It is preferable to use a hindered phenol-based antioxidant having a melting point of 200° C. or higher as the antioxidant. Examples of the hindered phenol-based antioxidant having a melting point of 200° C. or higher include 3,3',3",5,5',5"-hexa-tert-butyl-a,a',a"-(mesitylene-2,4,6-triyl)tri-p-cresol, and 1,3,5-tris(3,5-di-tert-butyl-4-hydroxybenzyl)-1,3,5-triazine-2,4,6(1H,3H,5H)-trione.

The blend amount of the antioxidant is preferably 1 to 10 parts by mass, and more preferably within a range of 1 to 5 parts by mass, with respect to 100 parts by mass of the total amount of the above resin components (A), (B), and (C). When the blend amount of the antioxidant is within the above range, excellent aging characteristics are achieved, and bloom or the like that is generated when a large amount of antioxidant is added can be reduced. The total blend amount of the antioxidant, a metal deactivator, and a lubricant is preferably 1 to 10 parts by mass, and more preferably within a range of 1 to 5 parts by mass, with respect to 100 parts by mass of the total amount of the above resin components (A), (B), and (C).

A copper deactivator, a chelating agent, or the like is used as the metal deactivator. Examples of the metal deactivator include hydrazide derivatives and salicylic acid derivatives. The addition of the metal deactivator makes it possible to improve the heat resistance. The blend amount of the metal deactivator is preferably within a range of 1 to 10 parts by mass, and more preferably within a range of 1 to 5 parts by mass, with respect to 100 parts by mass of the total amount of the above resin components (A), (B), and (C). Copper damage caused by a conductor can be prevented, bloom of the metal deactivator can be prevented, and inhibition of cross-linking of the silane-grafted resin caused by the reaction of the metal deactivator and the cross-linking catalyst can be favorably prevented. It is preferable to use the salicylic acid derivatives as the metal deactivator.

A lubricant used in this type of electric wire coating material can be used as the lubricant. Examples of the lubricant include hydrocarbons such as liquid paraffin, paraffin wax, and synthetic polyethylene wax; fatty acids; higher alcohols; fatty acid amides such as stearic acid amide, oleic acid amide, and erucic acid amide; alkylene fatty acid amides such as methylenebisstearic acid amide, and ethylenebisstearic acid amide; metal soap such as metal stearates; and ester-based lubricants such as monoglyceride stearate, stearyl stearate, and hardened oil. It is preferable to use a derivative of erucic acid, oleic acid, or stearic acid, or polyethylene-based paraffin wax as the lubricant in terms of the compatibility with the polyolefin.

The blend amount of the lubricant is preferably within a range of 1 to 10 parts by mass, and more preferably within a range of 1 to 5 parts by mass, with respect to 100 parts by mass of the total amount of the above resin components (A), (B), and (C). Setting the blend amount of the lubricant to be within the above range is advantageous in that a sufficient lubricating effect is exhibited, so that the surfaces of the electric wires are improved, and shear force decreases during resin mixing processing, thus making it possible to lower the resin temperature.

(H) Silicone Oil

The present design is particularly characterized in that silicone oil is blended. Silicone oil has high heat resistance and bleeds in the resin. Thus, the fluidity inside a molding machine is improved, and a mold release property is improved. The electric wires extruded from an extruder come out from the end of a die in a slightly spread state. In this case, when the fluidity is low, discharge is likely to be generated due to collapse at die openings, resulting in the formation of die lip build-up. To address this, the fluidity is improved through blending of the silicone oil, thus making it possible to prevent the formation of die lip build-up.

Examples of the silicone oil include dimethylsilicone oil, methylphenylsilicone oil, and silicone oil modified with fluorine, polyether, alcohol, amino, or phenol. Dimethylsilicone oil, alkyl-modified silicone oil, and the like, which have favorable compatibility with the base polyolefin, are preferable. The silicone oil may be blended as it is, or a polyolefin may be impregnated or mixed once with the silicone oil to form a masterbatch in order to improve the dispersibility of silicone. A typical example thereof is "Silicone Concentrate" (product name) manufactured by Dow Corning Toray Co., Ltd. The materials shown as the examples of the materials of the silane-modified polyolefin can be used as the above polyolefin.

A silicone layer is formed on the surface due to silicone oil being added to a resin mixture, and thus the surface unevenness is made smaller. This is advantageous in that the formation of die lip build-up can be suppressed during molding, and the wear resistance is improved during the molding of electric wires. Moreover, the silicone layer serves to form char during burning, and thus is expected to exhibit an effect as a flame retardant aid.

The blend amount of the silicone oil is preferably within a range of 0.5 to 5 parts by mass, and more preferably within a range of 1.5 to 5 parts by mass, with respect to 100 parts by mass of the total amount of the above resin components (A), (B), and (C).

When a masterbatch obtained by mixing the silicone oil with the polyolefin and the like is used, the blend amount of a mixture obtained by mixing the silicone oil and the polyolefin at a mass ratio of 1:1 is preferably 1 to 10 parts by mass, and more preferably within a range of 3 to 10 parts by mass, with respect to 100 parts by mass of the total amount of the above resin components (A), (B), and (C).

Other components than the above (A) to (H) may be added to the electric wire coating material composition as long as the object of the present invention is not impeded. Components that are added to this type of coating material for insulated electric wires can be used as the other components. For example, adjusting the hardness of the resin using a small amount of a filler such as magnesium oxide or calcium carbonate makes it possible to improve the processability and high-temperature deformation resistance characteristics. When a large amount of the filler is blended, the strength of the resin is likely to decrease. Therefore, it is preferable to set the blend amount thereof to less than 30 parts by mass, and preferably 5 parts by mass, with respect to 100 parts by mass of the total amount of the above resin components (A), (B), and (C).

Herinafter, an insulated electric wire and a wire harness of the present design will be described. In the insulated electric wire, the outer circumference of a conductor is coated with an insulating layer made of an electric wire coating material (also referred to merely as "coating material") obtained by performing water cross-linking on the above electric wire coating material composition. The diameter of the conductor of the insulated electric wire, the material thereof, and the like, are not particularly limited, and can be determined as appropriate depending on the application of the insulated electric wire, and the like. Examples of the conductor include copper, a copper alloy, aluminum, and an aluminum alloy. Moreover, the insulating layer made of the electric wire coating material may be constituted by a single layer or a plurality of layers including two or more layers.

In the insulated electric wire, the degree of cross-linking of the coating material is preferably 50% or more, and more preferably 60 mass % or more, in terms of the heat resistance. The degree of cross-linking can be adjusted by varying the amount of the silane coupling agent grafted to the olefin-based resin, the type and blend amount of the cross-linking catalyst, water cross-linking conditions (temperature and time), and the like.

In order to manufacture the insulated electric wire, it is sufficient that the silane graft batch (component a) containing the above silane-grafted polyolefin (A), the flame retardant batch (component b) obtained by kneading the above (B), (C), (D), (F), (G), and (H), and the above cross-linking catalyst batch (E) (component c) are heated and kneaded (kneading step), and then extrusion coating is performed on the outer circumference of the conductor (coating step), followed by performing water cross-linking (water cross-linking step).

In the above kneading step, the batches in a pellet form are mixed using a mixer, an extruder, or the like. The above components b and c may be kneaded into a pellet form in advance, or the components b and c may be individually formed into pellets. Moreover, the component a, namely the silane-grafted polyolefin, can also be formed into pellets.

In the above coating step, extrusion coating is performed using an extrusion molding machine. The above water cross-linking step is performed by exposing, to water vapor or water, the resin with which the coated electric wire is coated. It is preferable to perform the above water cross-linking step at a temperature within a range of room temperature to 90° C. for 48 hours or shorter. It is more preferable to perform the above water cross-linking step at a temperature within a range of 50 to 80° C. for 8 to 24 hours.

The wire harness of the present design includes the above insulated electric wire. The wire harness may be in the form of a single electric wire bundle obtained by binding only the above insulated electric wires together, or in the form of a mixed electric wire bundle obtained by binding the above insulated electric wires and other insulated electric wires together in a mixed state. The electric wire bundle is bound using a wire harness protecting material such as a corrugated tube, a binding material such as an adhesive tape, or the like, and formed into a wire harness.

ISO 6722 is an international standard for automobile electric wires, and classified into classes A to E depending on the allowable heat resistance temperature. The insulated electric wire of the present design has excellent heat resistance and is optimum for a battery cable and the like to which a high voltage is to be applied. With the insulated electric wire, the characteristics of class C, in which the heat resistance temperature is set to 125° C., and those of class D, in which the heat resistance temperature is set to 150° C., can be obtained.

EXAMPLES

Hereinafter, examples and comparative examples of the present design will be described. The present invention is not limited thereto.

Sample Materials and Manufacturers

Sample materials used in the examples and comparative examples are shown with their manufacturers and product names.

Silane-Grafted Polyolefin (Silane-Grafted PE 1 to Silane-Grafted PE 4)

Materials were obtained by using base resins having characteristics shown in Table 1 below as the polyolefin and dry blending 1 to 4 parts by mass of vinyltrimethoxysilane ("KMB 1003" (product name) manufactured by Shin-Etsu Chemical Co., Ltd.) and 0.1 to 0.5 parts by mass of dicumyl peroxide ("PERCUMYL D" (product name) manufactured by NOF Corporation) with 100 parts by mass of the base resins, and the obtained materials each were mixed using a single-screw extruder having an inner diameter of 25 mm at 140° C. Thus the silane-grafted polyolefins (component a) were prepared. The gel fractions of the obtained silane-grafted resins were measured using a method of hardening the silane-grafted resin through the addition of a cross-linking catalyst batch (the same cross-linking catalyst batches as those in the examples below were used) and then determining a gel fraction using a ratio between the masses prior to and after immersion in xylene. Table 1 also shows the measurement results of the gel fraction from each of the silane-grafted polyolefins.

Resins below were used as the base resins of the silane-grafted polyolefins shown in Table 1.

Silane-grafted PE 1: polyethylene (VLDPE) having a base density of 0.850

Silane-grafted PE 2: "ENGAGE 8100" (VLDPE) (product name) manufactured by Dow Elastomer Silane-grafted PE 3: "ENR 7256.02" (VLDPE) (product name) manufactured by Dow Elastomer Silane-grafted PE 4: "Sumikathene C215" (LDPE) (product name) manufactured by Sumitomo Chemical Co., Ltd.

TABLE 1

| | | Silane-grafted PE1 | Silane-grafted PE2 | Silane-grafted PE3 | Silane-grafted PE4 |
|---|---|---|---|---|---|
| Base resin characteristics | Density (g/cm³) | 0.85 | 0.87 | 0.885 | 0.92 |
| | Flexural modulus (MPa) | 4 | 13 | 27 | 130 |
| | MFR (g/10 min) | 2 | 1 | 2.5 | 2 |
| | Shore A hardness | 67 | 73 | 79 | 85 |
| | Degree of crystallization (%) | 13 | 18 | 23 | 45 |
| Silane-grafted resin characteristics | Gel fraction (%) | 92 | 90 | 70 | 60 |

Unmodified Polyolefin (PE1 to PE3, PP1)

The following resins were used as unmodified polyolefins. Table 2 shows the specific physical properties.

PE1: "ENR 7256.02" (VLDPE) (product name) manufactured by Dow Elastomer

PE2: "Sumikathene C215" (LDPE) (product name) manufactured by Sumitomo Chemical Co., Ltd.

PE3: "Novatec HDHY331" (HDPE) (product name) manufactured by Japan Polyethylene Corporation PP1: "Novatec EC9" (product name) manufactured by Japan Polypropylene Corporation

TABLE 2

| | | PE1 | PE2 | PE3 | PP1 |
|---|---|---|---|---|---|
| Base resin characteristics | Density (g/cm³) | 0.885 | 0.92 | 0.956 | 0.92 |
| | Flexural modulus (MPa) | 27 | 130 | 1000 | 1200 |
| | MFR (g/10 min) | 2.5 | 2 | 0.5 | 0.5 |
| | Degree of crystallization (%) | 23 | 45 | 90 | 90 |

Components Other than the Above Components

Components other than the above components are as follows.

PP elastomer: "Newcon NAR6" (product name) manufactured by Japan Polypropylene Corporation Maleic acid modified PE: "Modic AP512P" (product name) manufactured by NOF Corporation Epoxy modified PE: "Bondfast E" (E-GMA) (product name) manufactured by Sumitomo Chemical Co., Ltd.

Maleic acid modified PP: "Admer QB550" (product name) manufactured by Mitsubishi Chemical Corporation Methacryl modified PE: "Acryft WH102" (product name) manufactured by Sumitomo Chemical Co., Ltd.

Bromine-based flame retardant 1: Ethylenebis(pentabromobenzene), "Saytex 8010" (product name) manufactured by Albemarle Bromine-based flame retardant 2: TBBA-bis(dibromopropyl ether), "FCP-680" (product name) manufactured by Suzuhiro Chemical Co., Ltd.

Bromine-based flame retardant 3: Ethylenebistetrabromophthalimide, "Saytexbt-93W" (product name) manufactured by Albemarle Antimony trioxide: "Antimony trioxide MSW grade" (product name) manufactured by Yamanaka Sangyo Antioxidant 1: "Irganox 1010" (product name) manufactured by BASF Japan Antioxidant 2: "Irganox 3114" (product name) manufactured by BASF Japan Magnesium hydroxide: "Kisuma 5C" (product name) manufactured by Kyowa Chemical Industry Co., Ltd.

Copper damage preventing agent: "CDA-1" (product name) manufactured by ADEKA

Zinc oxide: "Zinc Flower Type 1" (product name) manufactured by Hakusuitech Co., Ltd.

Zinc sulfide: "Sachtolith HD-S" (product name) manufactured by Sachtleben Chemie Gmbh Imidazole compound: "ANTAGE MB" (product name) manufactured by Kawaguchi Chemical Industry Co., Ltd.

Lubricant 1: "Alflow P10" (erucic acid amide) (product name) manufactured by NOF Corporation Lubricant 2: "Alflow S10" (stearic acid amide) (product name) manufactured by NOF Corporation Lubricant 3: "Alflow E10" (oleic acid amide) (product name) manufactured by NOF Corporation Silicone oil 1: "KF-96L" (dimethylsilicone oil) (product name) manufactured by Shin-Etsu Chemical Co., Ltd.

Silicone oil 2: "KF-54" (methylphenylsilicone oil) (product name) manufactured by Shin-Etsu Chemical Co., Ltd.

Olefin-silicone oil mixture 1: "Silicone Concentrate BY27-002" (PE:silicone oil=1:1) (product name) manufactured by Dow Corning Toray Co., Ltd.

Olefin-silicone oil mixture 2: "Silicone Concentrate BY27-001S" (PP:silicone oil=1:1) (product name) manufactured by Dow Corning Toray Co., Ltd.

Cross-linking catalyst batch: "Linklon LZ015H" (product name) manufactured by Mitsubishi Chemical Corporation "Linklon LZ015H" contains polyethylene as a binder resin, and a tin compound as a cross-linking catalyst in an amount of less than 1%.

Preparation of Flame Retardant Batch (Component b)

Flame retardant batches were prepared by adding materials containing components other than the silane-grafted PE, the silane-grafted PP, and the cross-linking catalyst batch at the mass ratios of the examples and comparative examples shown in Tables 3 and 4 to a twin-screw extruding kneader, kneading the materials at 200° C. for 0.1 to 2 minutes, and forming pellets.

Preparation of Cross-Linking Catalyst Batch (Component c)

The above commercially available product that is supplied in a pellet form was used as a cross-linking catalyst batch.

Production of Insulated Electric Wire

The silane graft batch (component a), the flame retardant batch (component b), and the cross-linking catalyst batch (component c) were mixed at the blend mass ratios of the examples and comparative examples shown in Tables 3 and 4 in a hopper of the extruder, and extrusion processing was performed with the temperature of the extruder being set to about 160 to 210° C. In the extrusion processing, an insulator having a thickness of 0.7 mm was formed on a conductor having an outer diameter of 2.4 mm through extrusion coating, and thus a coating material was formed (with a coating outer diameter of 3.65 mm). Thereafter, water cross-linking processing was performed for 24 hours in a constant-temperature and constant-humidity oven in which the temperature was set to 60° C. and the humidity was set to 95%, and thus insulated electric wires were produced.

The obtained insulated electric wires were tested and evaluated for mixing productivity, molding productivity, ISO flame retardance, JASO gel fraction, ISO long-term heating testing, ISO wear resistance, flexibility, ISO heating deformation testing, and ISO chemical resistance. Tables 3 and 4 show the evaluation results together. It should be noted that the testing methods and the evaluation standards are as follows.

Mixing Productivity

The composition was mixed at a discharge rate of 10 kg per hour using a twin-screw mixer with a two-hole die having a screw diameter of 37 mm. Cases where die lip build-up did not come off and move to a strand for 60 minutes or longer were acceptable and were evaluated as "Good", and cases other than these cases were not acceptable and were evaluated as "Poor". Moreover, cases where the above standard was met for 120 minutes or longer were evaluated as "Excellent".

Molding Productivity

When the electric wires were molded, the linear speed was increased and reduced. Cases where die lip build-up was not formed and the design outer diameter could be obtained even when the linear speed was 50 mm/min or more were acceptable, and cases other than these cases were not acceptable and were evaluated as "Poor". Moreover, cases where the design outer diameter could be obtained in the same manner as mentioned above even when the linear speed was 100 mm/min or more were evaluated as "Excellent".

ISO Flame Retardance

In conformity with ISO 6722, cases where fire was extinguished in 70 seconds were acceptable and were evaluated as "Good", and cases where fire was not extinguished in 70 seconds were not acceptable and were evaluated as "Poor".

JASO Gel Fraction

The gel fraction was measured in conformity with JASO-D608-92. That is, about 0.1 g of a sample collected from the coating material of the insulated electric wire that had been subjected to water cross-linking was weighed and placed in a test tube, and 20 ml of xylene was added thereto. The resulting mixture was heated in a constant-temperature oil tank at 120° C. for 24 hours. Thereafter, the sample was removed and dried in a dryer at 100° C. for 6 hours. Then, the sample was allowed to cool to room temperature, and its weight was accurately measured. The mass percentage with respect to the mass prior to the testing was taken as the gel fraction. The samples having a gel fraction of 50% or more were acceptable and were evaluated as "Good", the samples having a gel fraction of 60% or more were evaluated as "Excellent", and the samples having a gel fraction of less than 50% were not acceptable and were evaluated as "Poor".

ISO Long-Term Heating Testing

In conformity with ISO 6722, aging testing at 150° C. for 3000 hours was performed on the insulated electric wire, and then voltage resistance testing at 1 kv for 1 min was performed. As a result, cases where the insulated electric wire could withstand the voltage resistance testing without electrical breakdown were acceptable and were evaluated as "Good", and cases where the insulated electric wire could not withstand the voltage resistance testing were not acceptable and were evaluated as "Poor".

ISO Wear Resistance Testing

In conformity with ISO 6722, an iron wire having an outer diameter of 0.45 mm was pressed against the insulated electric wire that had been subjected to water cross-linking with a load of 7 N, and was reciprocated at a speed of 55 times per minute. The number of reciprocations until the iron wire and copper, which is a conductor, became electrically continuous was counted. Cases where the number was 700 or more were acceptable and were evaluated as "Good", and cases where the number was less than 700 were not acceptable and were evaluated as "Poor".

ISO Heating Deformation Test

In conformity with ISO 6722, a 0.7-mm blade was pressed against the insulated electric wire that had been subjected to water cross-linking with a load of 190 g, and was left in a constant-temperature oven at 150° C. for 4 hours, and then voltage resistance testing at 1 kv for 1 minute was performed on the insulated electric wire in a 1% saline solution. Cases where electrical breakdown did not occur were acceptable and were evaluated as "Good", and cases where electrical breakdown occurred were not acceptable and were evaluated as "Poor". Moreover, the ratio of the thickness of the insulating coating after the testing with respect to the same-direction total thickness (in the case of 0.7 mm on one side, 0.7×2=1.4 mm) thereof was taken as a retention rate, and cases where the retention rate was 75% or more were evaluated as "Excellent".

Retention rate (%)=total thickness after testing/total thickness prior to testing×100

Flexibility

With reference to JIS K7171, three-point bending flexibility was evaluated using Autograph AG-01 manufactured by Shimadzu. That is, the insulated electric wire that had been subjected to water cross-linking was cut into a length of 100 mm. Three cut pieces were set on a jig with a space of 50 mm between supports, with the three cut pieces being laterally lined up and their ends being fixed using a tape made of polyvinyl chloride. The sample was pressed at the center between the support from above at a speed of 1 mm/minute, and the maximum load was measured. Cases where the load was 3 N or less were acceptable and were evaluated as "Good", and cases where the load exceeded 3 N were not acceptable and were evaluated as "Poor".

ISO Chemical Resistance

The measurement was in conformity with Method 2 of ISO chemical resistance. The insulated electric wire that had been subjected to water cross-linking was cut into a length of 600 mm. The cut insulated wire was immersed in a mixed solution of toluene and 2,2,4 trimethylpentane (mass ratio of 50:50) at 20° C. for 20 hours, and then removed therefrom. Its surface was lightly wiped using Kimtowel (product name of paper wiper manufactured by Nippon Paper Crecia Co., Ltd.), the insulated wire was allowed to stand for 30 minutes, and then the outer diameter was measured in 5 minutes. The rate of change in the outer diameter was determined from the outer diameters prior to and after the immersion using the following equation. Cases where the rate of change was less than 15% were acceptable and were evaluated as "Good", and cases where the rate of change exceeded 15% were not acceptable and were evaluated as "Poor".

Rate of change in outer diameter (%)=(outer diameter after immersion−outer diameter prior to immersion)/outer diameter prior to immersion× 100

As shown in Table 3, Examples 1 to 6 contained the components specified in the present application, and therefore, the insulated electric wires in which all the evaluations for the mixing productivity, molding productivity, ISO flame retardance, JASO gel fraction, ISO long-term heating testing, ISO wear resistance, flexibility, ISO heating deformation testing, and ISO chemical resistance were acceptable or better could be obtained. On the other hand, as shown in Table 4, Comparative Examples 1 to 7 did not contain all the components specified in the present design, and therefore, no insulated electric wires that could satisfy all the characteristics was obtained.

Although the embodiment of the present design has been described in detail, the present invention is not limited to the above embodiment, and various modifications can be made without departing from the gist of the present invention.

TABLE 3

| | Examples | | | | | |
|---|---|---|---|---|---|---|
| Component ratio (parts by mass) | 1 | 2 | 3 | 4 | 5 | 6 |
| Silane-grafted PE1 | | | | | | |
| Silane-grafted PE2 | 60 | | | 70 | 65 | |
| Silane-grafted PE3 | | 60 | | | | 50 |
| Silane-grafted PE4 | | | 70 | | | |
| PE1 | | 30 | 20 | | | |
| PE2 | 30 | | | | | |
| PE3 | | | | 20 | | 20 |
| PP1 | | | | | 10 | |
| PP elastomer | | 5 | | | | |
| Maleic acid modified PE | 5 | 5 | | | 25 | |
| Epoxy modified PE | | | | 10 | | |
| Maleic acid modified PP | | | 10 | | | |
| Methacryl modified PE | | | | | | 10 |
| Bromine-based flame retardant 1 | 30 | | | 30 | 20 | 20 |
| Bromine-based flame retardant 2 | | | 40 | | | |
| Bromine-based flame retardant 3 | | 30 | | | | 30 |
| Antimony trioxide | 10 | 10 | 15 | 15 | 10 | 12 |
| Magnesium hydroxide | | | | | | |
| Antioxidant 1 | | | 2 | 2 | | |
| Antioxidant 2 | 3 | 2 | | | 1 | 1 |
| Copper damage preventing agent | 1 | 1 | 1 | 0.5 | 0.5 | 0.5 |
| Zinc oxide | 10 | 8 | | 5 | 12 | |
| Zinc sulfide | | | 15 | | | 20 |
| Imidazole compound | 10 | 8 | | 5 | 12 | |
| Lubricant 1 | 1 | 1 | | | 1 | |
| Lubricant 2 | | | 1 | | | 1 |
| Lubricant 3 | | | | 1 | | |
| Silicone oil 1 | | | 4 | | | 2 |
| Silicone oil 2 | | | | 10 | | |
| Olefin-silicone oil mixture 1 | | | | | | 12 |

TABLE 3-continued

|  | Examples | | | | | |
| --- | --- | --- | --- | --- | --- | --- |
|  | 1 | 2 | 3 | 4 | 5 | 6 |
| Olefin-silicone oil mixture 2 | 3 | 3 |  |  | 5 |  |
| Cross-linking catalyst batch | 5 | 5 | 5 | 5 | 5 | 5 |
| Total | 168 | 168 | 183 | 173.5 | 166.5 | 183.5 |
| Testing results | | | | | | |
| Mixing productivity | Excellent | Excellent | Excellent | Good | Excellent | Excellent |
| Molding productivity | Excellent | Excellent | Excellent | Good | Excellent | Excellent |
| ISO flame retardance | Good | Good | Good | Good | Good | Good |
| JASO gel fraction | Excellent | Good | Good | Excellent | Excellent | Good |
| ISO long-term heating testing | Good | Good | Good | Good | Good | Good |
| ISO wear resistance | Excellent | Excellent | Excellent | Good | Excellent | Good |
| Flexibility | Good | Good | Good | Good | Good | Good |
| ISO overheating deformation testing | Excellent | Good | Good | Excellent | Excellent | Good |
| ISO chemical resistance | Good | Good | Good | Good | Good | Good |

TABLE 4

|  | Comparative Examples | | | | | | |
| --- | --- | --- | --- | --- | --- | --- | --- |
|  | 1 | 2 | 3 | 4 | 5 | 6 | 7 |
| Component ratio (parts by mass) | | | | | | | |
| Silane-grafted PE1 | 60 | | | | | | |
| Silane-grafted PE2 | | | | 70 | 65 | | 70 |
| Silane-grafted PE3 | | | 70 | | | 50 | |
| Silane-grafted PE4 | | | | | | | |
| PE1 | | 90 | 20 | | | | |
| PE2 | 30 | | | | | | |
| PE3 | | | | 30 | | 20 | 25 |
| PP1 | | | | | 10 | | |
| PP elastomer | | 5 | | | | | |
| Maleic acid modified PE | 5 | 5 | | | 25 | | |
| Epoxy modified PE | | | | | | | |
| Maleic acid modified PP | | | 10 | | | | 5 |
| Methacryl modified PE | | | | | | 10 | |
| Bromine-based flame retardant 1 | 30 | | | 30 | | 20 | 30 |
| Bromine-based flame retardant 2 | | | | | | | |
| Bromine-based flame retardant 3 | | 30 | | | | 30 | |
| Antimony trioxide | 10 | 10 | | 15 | | 12 | 15 |
| Magnesium hydroxide | | | | | 80 | | |
| Antioxidant 1 | | | 2 | 2 | | | 2 |
| Antioxidant 2 | 3 | 2 | | | 1 | 1 | |
| Copper damage preventing agent | 1 | 1 | 1 | 0.5 | 0.5 | 0.5 | 0.5 |
| Zinc oxide | 10 | 8 | | | 8 | | 5 |
| Zinc sulfide | | | 15 | | | 20 | |
| Imidazole compound | 10 | 8 | | | 8 | | 5 |
| Lubricant 1 | 1 | 1 | | | 1 | | |
| Lubricant 2 | | | 1 | | | | |
| Lubricant 3 | | | | 1 | | | 1 |
| Silicone oil 1 | | | 4 | | | | |
| Silicone oil 2 | | | | 10 | | | |
| Olefin-silicone oil mixture 1 | | | | | | | |

TABLE 4-continued

|  | Comparative Examples | | | | | | |
| --- | --- | --- | --- | --- | --- | --- | --- |
|  | 1 | 2 | 3 | 4 | 5 | 6 | 7 |
| Olefin-silicone oil mixture 2 | 3 | 3 |  |  | 5 |  |  |
| Cross-linking catalyst batch | 5 | 5 | 5 | 5 | 5 | 5 | 5 |
| Total | 168 | 168 | 128 | 163.5 | 208.5 | 168.5 | 163.5 |
| Testing results |  |  |  |  |  |  |  |
| Mixing productivity | Good | Excellent | Excellent | Poor | Excellent | Poor | Poor |
| Molding productivity | Good | Excellent | Excellent | Poor | Excellent | Poor | Poor |
| ISO flame retardance | Good | Good | Poor | Good | Good | Good | Good |
| JASO gel fraction | Excellent | Poor | Good | Excellent | Excellent | Good | Excellent |
| ISO long-term heating testing | Good | Poor | Good | Poor | Poor | Good | Good |
| ISO wear resistance | Poor | Good | Poor | Poor | Excellent | Poor | Poor |
| Flexibility | Good | Good | Good | Good | Good | Good | Good |
| ISO overheating deformation testing | Poor | Poor | Good | Excellent | Excellent | Good | Excellent |
| ISO chemical resistance | Poor | Good | Poor | Poor | Good | Good | Good |

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electric wire coating material composition comprising:
   a silane-grafted polyolefin (A) obtained by grafting a silane coupling agent to a polyolefin having a density of 0.855 to 0.920 g/cm$^3$;
   an unmodified polyolefin (B) having a density of 0.885 to 0.956 g/cm$^3$;
   a modified polyolefin (C) modified with one or more functional groups selected from a carboxylic acid group, an acid anhydride group, an amino group, an acrylic group, a methacrylic group, and an epoxy group;
   a bromine-based flame retardant and antimony trioxide (D);
   a cross-linking catalyst batch (E) obtained by dispersing a cross-linking catalyst in a binder resin;
   zinc oxide and an imidazole-based compound modified with a mercapto group, or zinc sulfide (F);
   an antioxidant, a metal deactivator, and a lubricant (G);
   silicone oil (H); and
   no metal hydroxides,
   wherein the polyolefin used in the silane-grafted polyolefin (A) prior to silane-grafting has a degree of crystallization of 10 to 25%, a melt flow rate of 0.5 to 5 g/10 minutes at 190° C. under a load of 2.16 kg, a Shore A hardness of 55 to 80, and a flexural modulus of 3 to 350 MPa, and the silane-grafted polyolefin has a gel fraction of 70 to 95%,
   the unmodified polyolefin (B) has a melt flow rate of 0.5 to 5 g/10 minutes at 190° C. under a load of 2.16 kg, and a flexural modulus of 10 to 1000 MPa,
   the bromine-based flame retardant (D) has a melting point of 200° C. or higher, or alternatively is ethylenebistetrabromophthalimide or ethylenebispentabromophenyl, and the antioxidant (G) is hindered phenol having a melting point of 200° C. or higher, the metal deactivator is a salicylic acid derivative, and the lubricant is a derivative of erucic acid, oleic acid, or stearic acid, or polyethylene-based wax.

2. The electric wire coating material composition according to claim 1, wherein the silicone oil (H) is dimethylsilicone oil or a mixture of dimethylsilicone oil and a polyolefin.

3. The electric wire coating material composition according to claim 1, wherein the polyolefin in the silane-grafted polyolefin (A) prior to silane-grafting has a density of 0.855 to 0.900 g/cm$^3$, and the unmodified polyolefin (B) has a density of 0.885 to 0.955 g/cm$^3$.

4. The electric wire coating material composition according to claim 1, comprising:
   the silane-grafted polyolefin (A) in an amount of 30 to 90 parts by mass; and
   a total of the unmodified polyolefin (B) and the modified polyolefin (C) in an amount of 10 to 70 parts by mass;
   the electric wire coating material comprising, with respect to 100 parts by mass of a total of the (A), (B), and (C):
   the bromine-based flame retardant and the antimony trioxide (D) in an amount of 10 to 70 parts by mass;
   the cross-linking catalyst batch (E) in an amount of 2 to 20 parts by mass, the cross-linking catalyst batch comprising a silanol condensation catalyst in an amount of 0.5 to 5 parts by mass with respect to 100 parts by mass of a polyolefin;

the zinc oxide and the imidazole-based compound (F) each in an amount of 1 to 15 parts by mass, or the zinc sulfide in an amount of 1 to 15 parts by mass;

the antioxidant, the metal deactivator, and the lubricant (G) in an amount of 1 to 10 parts by mass in total; and the silicone oil (H) in an amount of 0.5 to 5 parts by mass, or a mixture of silicone oil and a polyolefin at a mass ratio of 1:1 in an amount of 1 to 10 parts by mass.

5. The electric wire coating material composition according to claim 1, wherein the polyolefin used in the silane-grafted polyolefin (A) and the polyolefin used in the unmodified polyolefin (B) are one or more selected from very low-density polyethylene, linear low-density polyethylene, and low-density polyethylene.

6. An insulated electric wire comprising an electric wire coating material made of a cross-linked polyolefin resin obtained by performing water cross-linking on the electric wire coating material composition according to claim 1.

7. The insulated electric wire according to claim 6, wherein the electric wire coating material composition according to claim 1 comprises:

a component a including the silane-grafted polyolefin (A);

a component b including the unmodified polyolefin (B), the modified polyolefin (C), the bromine based flame retardant and the antimony trioxide (D), the zinc oxide and the imidazole-based compound, or zinc sulfide (F), and the antioxidant, the metal deactivator, and the lubricant (G), and silicone oil (H) or a mixture of silicone oil and a polyolefin; and a component c including the cross-linking catalyst batch (E), and the components a, b, and c are kneaded and used to form an electric wire coating material around an electric wire conductor, and water cross-linking is performed on the electric wire coating material.

8. A wire harness comprising the insulated electric wire according to claim 6.

* * * * *